(12) United States Patent
Andrew

(10) Patent No.: US 8,818,914 B2
(45) Date of Patent: *Aug. 26, 2014

(54) SYSTEM AND METHOD FOR REDIRECTING MAIL

(75) Inventor: Emily Andrew, Martinsburg, WV (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,218

(22) Filed: Aug. 13, 2012

(65) Prior Publication Data

US 2013/0304662 A1    Nov. 14, 2013

Related U.S. Application Data

(63) Continuation of application No. 10/473,736, filed as application No. PCT/US02/09872 on Apr. 2, 2002, now Pat. No. 8,255,339.

(60) Provisional application No. 60/280,156.

(51) Int. Cl.
*G07B 17/02* (2006.01)

(52) U.S. Cl.
USPC ............................................ 705/401

(58) Field of Classification Search
USPC ............................................ 705/401
See application file for complete search history.

(56) References Cited

U.S. PATENT DOCUMENTS

| | | | |
|---|---|---|---|
| 5,648,916 A | 7/1997 | Manduley | |
| 5,659,599 A | 8/1997 | Arumainayagam et al. | |
| 6,157,945 A * | 12/2000 | Balma et al. | 709/206 |
| 6,259,405 B1 | 7/2001 | Stewart et al. | |
| 6,360,101 B1 * | 3/2002 | Irvin | 455/456.6 |
| 6,389,455 B1 * | 5/2002 | Fuisz | 709/206 |
| 6,405,243 B1 | 6/2002 | Nielsen | |
| 6,438,583 B1 | 8/2002 | McDowell et al. | |
| 6,438,585 B2 | 8/2002 | Mousseau et al. | |
| 7,058,586 B1 * | 6/2006 | Law | 705/5 |
| 7,130,803 B1 * | 10/2006 | Couch et al. | 705/1.1 |
| 7,206,768 B1 * | 4/2007 | deGroeve et al. | 705/54 |
| 7,280,982 B1 * | 10/2007 | Moskowitz et al. | 705/52 |
| 7,769,611 B1 | 8/2010 | Rodriguez et al. | |
| 8,255,339 B2 * | 8/2012 | Andrew | 705/401 |

(Continued)

OTHER PUBLICATIONS

Card News, "Industry Meets Challenge of Identity Fraud," Potomac, Jul. 6, 1998, vol. 13, Iss. 13, p. 1.*

(Continued)

*Primary Examiner* — Nathan Erb
(74) *Attorney, Agent, or Firm* — Finnegan, Henderson, Farabow, Garrett & Dunner LLP

(57) ABSTRACT

A method for temporarily redirecting a customer's mail from a current mailing address to a temporary mailing address, includes: receiving a request to temporarily redirect the customer's mail; determining a first date to begin mail redirection and a second date to cancel mail redirection; redirecting a first type of mail to a temporary mailing address; instructing a delivery service provider to provide a package to the customer after the customer arrives at the temporary mailing address; instructing the delivery service provider to hold a second type of mail for a time period calculated based on the request; receiving a notification that the customer has arrived at the temporary mailing address; and informing at least one contact specified by the customer that the customer has arrived at the temporary mailing address.

20 Claims, 3 Drawing Sheets

(56) References Cited

U.S. PATENT DOCUMENTS

| | | | |
|---|---|---|---|
| 2001/0037463 A1* | 11/2001 | Salta | 713/201 |
| 2001/0051988 A1 | 12/2001 | Kim | |
| 2002/0010687 A1 | 1/2002 | Gawler | |
| 2002/0042808 A1* | 4/2002 | Smith et al. | 709/1 |
| 2002/0057824 A1 | 5/2002 | Andreasson | |
| 2002/0082030 A1 | 6/2002 | Berndt et al. | |
| 2002/0143430 A1* | 10/2002 | Sansone et al. | 700/226 |
| 2004/0220854 A1* | 11/2004 | Postrel | 705/14 |

OTHER PUBLICATIONS

Bray, Roger, "Technology Tickles the Taste Buds Travel Update," Financial Times, Surveys Edition, London, United Kingdom, Jun. 11, 1998, p. 10.*

Siegal, Ann Cameron, "Complex Boasts Convenience, Surprise Treasures," Final Edition, The Washington Post, Washington, DC, Mar. 2, 2001, p. T.03.

Card News, "Industry Meets Challenge of Identity Fraud," Potomac, Jul. 6, 1996, vol. 13, Iss. 13, p. 1.

Nemchek; "Unidentified Mail Management: A Model Policy and Procedures Manual for the Legal Environment"; Records Management Quarterly, vol. 31, No. 4, pp. 27-42, (1997).

Fleishman, Sandra, "Troupes Break a Leg to Find Rentals," The Washington Post, Final Edition, Washington, DC, Feb. 27, 1999, p. H.01.

International Search Report dated Jan. 9, 2003, from PCT/US02/09872.

* cited by examiner

SYSTEM AND METHOD FOR REDIRECTING MAIL

CROSS-REFERENCE TO RELATED APPLICATION

This application is a continuation of U.S. application Ser. No. 10/473,736, filed on Oct. 2, 2003, which is a National Stage Entry of International Application No. PCT/US02109872, filed on Apr. 2, 2002, which claims the benefit of priority to U.S. Provisional Application No. 60/280,156, filed on Apr. 2, 2001, all of which are incorporated herein by reference.

FIELD

The present invention relates generally to systems and methods for temporarily redirecting mail.

BACKGROUND

Travelers often need or desire to receive their mail while they are temporarily away from their current mailing address. Current systems limit the type of mail and the time period that a customer may temporarily redirect mail. These systems further limit how and when the customers mail is redirected. Generally, these systems offer the customer limited flexibility in temporarily redirecting the customer's mail. Accordingly, there is a need for a flexible system and method for temporarily redirecting mail.

SUMMARY

A method for temporarily redirecting a customer's mail from a current mailing address to a temporary mailing address is provided. The method comprises receiving a request to temporarily redirect the customer's mail. The request specifies at least one type of mail to redirect, the temporary mailing address, how to redirect the mail, and when to redirect the mail. The method further comprises redirecting the customer's mail to the temporary mailing address according to the request.

Further, there is provided a computer readable medium containing instructions for controlling a computer system to perform a method. The method comprise receiving a request to temporarily redirect the customer's mail, wherein the request specifies at least one type of mail to redirect, the temporary mailing address, how to redirect the mail, and when to redirect the mail.

Still further, there is provided a system for temporarily redirecting a customer's mail from a current mailing address to a temporary mailing address is provided. The system comprises means for receiving a request to temporarily redirect the customer's mail. The request specifies at least one type of mail to redirect, the temporary mailing address, how to redirect the mail, and when to redirect the mail. The system further comprises means for redirecting the customer's mail to the temporary mailing address according to the request.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Figure 1:
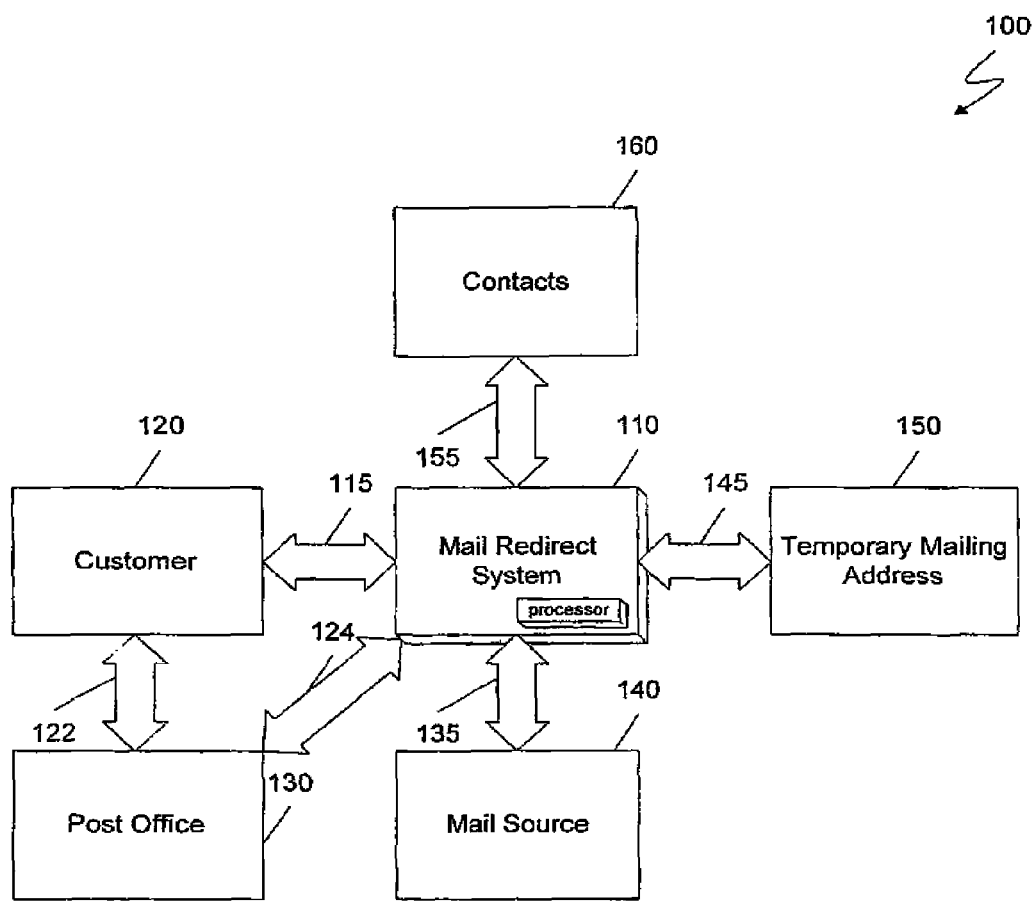
FIG. 1 illustrates an environment for temporarily redirecting a customer's mail from a current mailing address to a temporary mailing address for a period a time.
Figure 2:
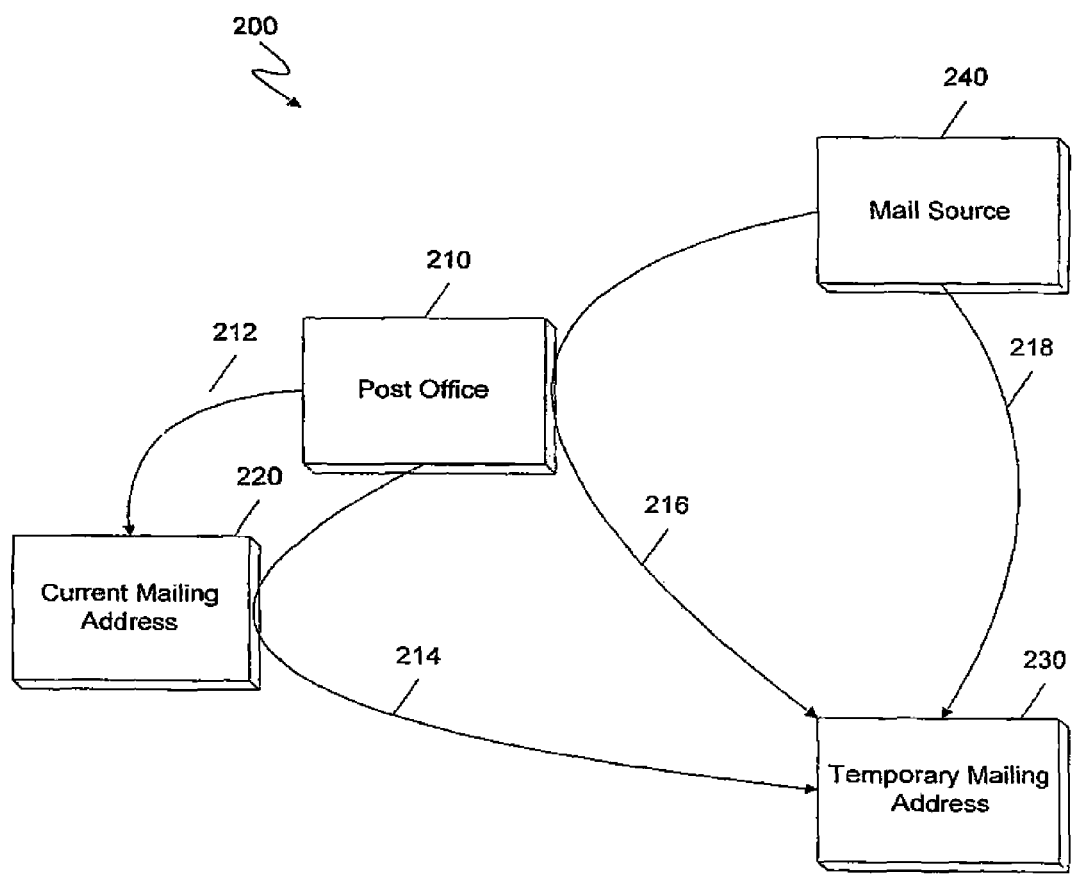
FIG. 2 illustrates an environment for temporarily redirecting a customer's mail from a current mailing address to a temporary mailing address for a period a time.

Referring now to the drawings, FIGS. 1 and 2 illustrate an environment 100, 200 for temporarily redirecting a customer's mail from a current mailing address to a temporary mailing address for a period a time. Environment 100 comprises a mail redirect system 110, a customer 120, a post office 130, a mail source 140, a temporary mailing address 150, and one or more contacts 160.

Customer 120 may be any person, business, organization, or any other entity that desires to redirect all or a portion of its mail to temporary mailing address 150. Mail redirect system 110 may facilitate the redirection of customer's 120 mail. Mail redirect system 110 may include a processor containing computer instructions for implementing methods consistent with the present invention. Customer 120 and mail redirect system 110 may communicate via a communication link 115.

Mail redirect system 110 may communicate with post office 130, 210 to redirect customer's 120 mail. Alternatively, customer 120 may communicate with post office 130, 210 to redirect customer's 120 mail. Mail redirect system 110 and post office 130, 210 may communicate via a communication link 124. Accordingly, a mail redirection system for redirecting the customer's mail may comprise mail redirect system 110, communication link 124, and post office 130. Customer 120 and post office 130, 210 may communicate via a communication link 122.

As shown in FIG. 2, post office 210 may redirect 214 customer's mail from current mailing address 220 to temporary mailing address 230. If customer 120 specifies that only a portion of its mail is to be redirected, then the remaining mail may be delivered 212 to current mailing address 220. Alternatively, the remaining mail may be held at post office 210. Post office 210 may redirect the customer's mail by informing a carrier/clerk not to deliver the customer's mail to the current mailing address 220. The carrier/clerk may instead repackage the customer's mail for delivery to the temporary mailing address 230, in accordance with customer's request. Alternatively, an automated system may be used to repackage the customer's mad for delivery to the temporary mailing address 230.

Mail source 140, 240 may be any person, business, organization, or any other entity that sends mail to customer 120. Mail redirect system 110 may communicate with mail source 140, 240 to redirect customer's 120 mail. As shown in FIG. 2, instead of post office 210 redirecting 216 mail from mail source 240 to temporary mailing address 230, mail source 240 may deliver 218 the mail directly to temporary mailing address 230. As shown in FIG. 1, mail redirect system 110 and mail source 140, 240 may communicate via a communication link 135. In addition, post office 130 may communicate with mail source 140, 240 to redirect customer's 120 mail directly to temporary mailing address 230.

Temporary mailing address 150, 230 may be any mailing address other than customer's 120 current mailing address 220. For example, temporary mailing address 150 may be an address corresponding to a hotel, business, residence, or post office box. Temporary mailing address 150, 230 and mail redirect system 110 may communicate via a communication link 145.

One or more contacts 160 may be any person, business, organization, or any other entity that customer 120 desires mail redirect system 110 to contact, as described in greater detail below. One or more contacts 160 and mail redirect system 110 may communicate via a communication link 155.

Each of communication links 115, 122, 124, 135, 145, 155 may be any system, network, or device that facilitates communication (e.g., data communication or telecommunication) using any appropriate communication protocol (e.g., TCP/IP, HTTP, HTTPS or any other security protocol, FTP, SMTP, or any other proprietary protocol). Each of communication links 115, 122, 124, 135, 145, 155 may comprise a local area network (LAN) connection, a wide area network (WAN) connection, an Internet connection, or a combination of the foregoing. Each of communication links 115, 122, 124, 135, 145, 155 may comprise a telephone line, optical fiber, coaxial cable, twisted wire pair, or a combination of the foregoing. Each of communication links 115, 122, 124, 135, 145, 155 may be wireless using any appropriate technique to provide wireless transmission including infrared line of sight, cellular, microwave, satellite, packet radio, spread spectrum, or a combination of the foregoing.

Figure 3:
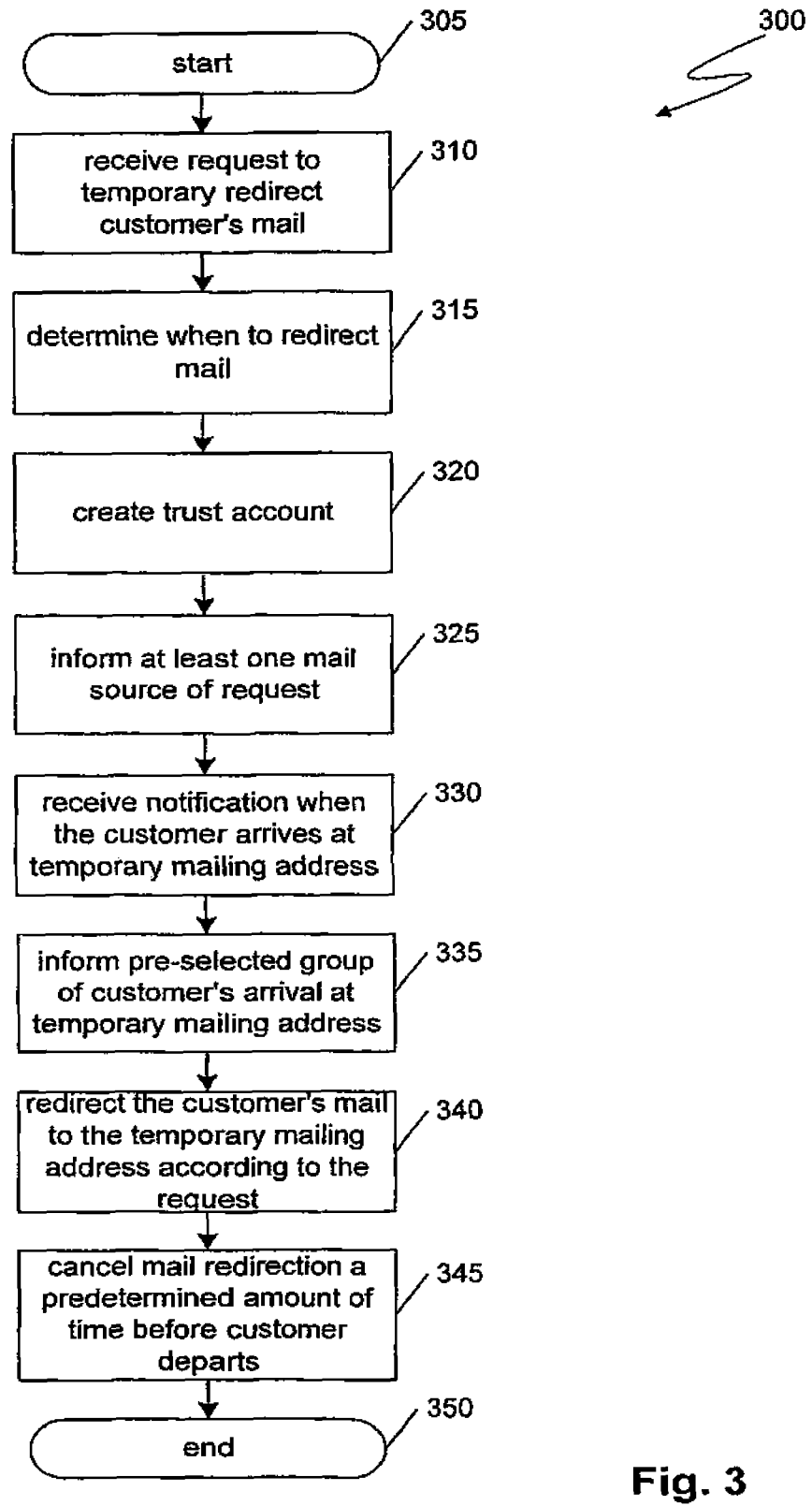
FIG. 3 illustrates a method consistent with the present invention for redirecting a customer's mail from a current maling address to a temporary mailing address for a period a time.

FIG. 3 illustrates a method consistent with the present invention for redirecting a customer's mail from a current mailing address to a temporary mailing address for a period a time. At stage 310, mail redirect system 110 receives a request to temporarily redirect customer's 120 mail from current mailing address 220 to temporary mailing address 230.

The request may specify customer's 120 current mailing address 220 and temporary mailing address 230. Mail redirect system 110 may confirm that current mailing address 220 and temporary mailing address 230 are valid mailing addresses. The request may further specify a date customer 120 will arrive at temporary mailing address 230 and a date customer 120 will depart from temporary mailing address 230. The request may also specify a date customer 120 will arrive back at current mailing address 220. Still further, the request may specify a date customer 120 desires its mail to be redirected and a date customer 120 desires mail redirection to be cancelled. Alternatively, mail redirect system 110 may determine the date to begin mail redirection and the date to cancel mail redirection based on the arrival date to and the departure date from the temporary mailing address 230 received.

The request may specify that all mail is to be redirected. Alternatively, the request may specify that one or more types of mail are to be redirected. For example, the request may specify that bills, periodicals (e.g., newspapers, magazines), and/or letters are to be redirected. The request may specify that advertisements and/or bulk mail are to be delivered to current mailing address 220 or held at post office 130, 210, for example.

The request may specify how the mail is to be redirected. For example, the request may specify that the mail is to be redirected using an expedited mailing process such as Priority Mail™ or Express Mail™. The request may specify how often (e.g., daily or weekly) the mail is to be redirected.

The request may be received via communication link 115. The request may be received when a form is completed and submitted via the Internet, for example. As an alternative, the request may be received when a form is completed and delivered to post office 130, 210. Post office 130, 210 may communicate the form to mail redirect system 110 via communication link 124. As another alternative, the request may be received via the telephone.

At stage 315, mail redirect system 110 determines when to redirect the mail based on the request. If the request specifies a date mail redirection is to begin, then the date specified may control. Alternatively, mail redirect system 110 may determine the date to begin mail redirection. Once mail redirection has begun, mail redirect system 110 may determine when to redirect mail based on the frequency specified in the request. The determination made at stage 315 may be communicated to post office 130, 210 via communication link 124. Alternatively, if the request was received by post office 130, 210, then post office 130, 210 may make the determination at stage 315.

At stage 320, mail redirect system 110 creates a trust account to be funded by customer 120 to cover a cost or fee charged to redirect customer's 120 mail. The amount funded by customer 120 may be an estimated cost, including postage, to redirect customer's 120 mail. The cost may be based on how, how often, and where the mail is being redirected. Each time the mail is redirected, the trust account may be electronically debited an amount by mail redirect system 110 to cover the cost or fee to redirect the mail.

At stage 325, mail redirect system 110 informs at feast one mail source 140, 240 of the request so that mail source 140, 240 may redirect the mail from the mail source 140, 240 to the temporary mailing address 230. For example, once the mail source 140, 240 is informed of the request, mail source 140, 240 may change customer's 120 mailing address from current mailing address 220 to temporary mailing address 230 so that customer's 120 mail is delivered to temporary mailing address 230 directly 218. Mail redirect system 110 may informs mail source 140, 240 via communication link 135.

At stage 330, mail redirect system 110 receives notification that customer 120 has arrived at temporary mailing address 230. For example, if temporary mailing address 230 is a hotel, then mail redirect system 110 may receive notification from the hotel that customer 120 has arrived when customer 120 checks-in at the hotel. Mail redirect system 110 may receive notification via communication link 145.

Mail redirect system 110 may provide a package to customer 120 when customer 120 arrives at temporary mailing address 230. The package may be based on profile information on customer 120 received via communication link 155. The profile information may be received at the time the request is received at stage 310 or before the request is received, for example when customer 120 registers with mail redirect system 110. The profile information may include information on customer's 120 needs and interests. For example, if the profile information indicates that customer's 120 needs or interests include jogging, then the package may include a map of jogging trails near temporary mailing address 230. The packages may also include coupons for services or goods. The package may also include contact information for restaurants, grocery stores, malls, or medical facilities near temporary mailing address 230. The package may also include a confirmation that customer's 120 mail will be redirected to temporary mailing address 230.

At stage 335, mail redirect system 110 informs one or more contacts 160 of customer's 120 arrival at temporary mailing address 230. Mail redirect system 110 may inform contacts 160 via communication link 155. For example mail redirect system 110 may inform the contacts 160 by emailing the contacts based on email addresses received. The email addresses may be received by mail redirect system 110 at the time the request is received at stage 310 or before the request is received, for example when customer 120 registers with mail redirect system 110. Mail redirect system 110 may further provide the contacts 160 with contact information to contact customer 120, such as a contact address or telephone number.

At stage 340, post office 130, 210 redirects customer's 120 mail to temporary mailing address 230 according to the request received at stage 310. In one embodiment, temporary mailing address 230 comprises a post office box. In that case, mail is redirected to the post office box. Mail redirect system 110 may provide information on the contents of the post office box to customer 120 via communication link 115. For example, the information on the contents of the post office box may be provided via the Internet. The information on the contents of the post office box may comprise a number of mail pieces in the post office box. In this way, customer 120 will know whether a trip to the post office box is necessary.

At stage 345, mail redirect system 110 cancels mail redirection a predetermined amount of time before customer 120 departs from temporary mailing address 230. This prevents mail from arriving at temporary mailing address 230 after customer 120 has departed. The predetermined amount of time may depend on a time required to redirect mail to temporary mailing address 230. For example, if it takes three days to deliver mail to temporary mailing address 230, then mail redirection may be cancelled fours days before customer is scheduled to depart from temporary mailing address. Alternatively, a set period may be determined for all cases. For example, the mail redirection may be cancelled one week before customer 120 is scheduled to depart from temporary mailing address 230. As yet another alternative, if the request received at stage 310 specifies a date mail redirection is to be cancelled, then the date specified may control.

Once mail redirection is cancelled, customer's 120 mail may be held at post office 210 until customer 120 arrives at current mailing address 220. Post office 210 may hold the customer's mail by informing a carrier/clerk not to deliver the customer's mail to the current mailing address 220 or repackage the customer's mail for delivery to the temporary mailing address 230. Alternatively, an automated system may be used to hold the customer's mail.

Once customer 120 arrives at current mailing address 220, post office 210 may deliver customer's 120 accumulated mail during the next scheduled delivery. Alternatively, post office 210 may deliver customer's 120 accumulated mail on demand. That is, once customer 120 arrives at the current mailing address 220, customer's 120 accumulated mail may be delivered to customer 120 before the next scheduled delivery based on customer's request.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for temporarily redirecting a customer's mail from a current mailing address to a temporary mailing address, the method comprising:

receiving, by a mail redirect computer system, a request to temporarily redirect the customer's mail, wherein the request specifies a user profile, a first type of mail to redirect, a second type of mail, the temporary mailing address, how to redirect the first type of mail, an arrival date, and a departure date, the arrival date being the date the customer will arrive at the temporary mailing address and the departure date being the date the customer will depart from the temporary mailing address;

determining, by the mail redirect computer system, a first date to begin mail redirection based on the arrival date and a number of days in advance required to redirect the first type of mail to the temporary mailing address, and determining a second date to cancel mail redirection based on the departure date and the number of days in advance required to redirect the first type of mail to the temporary mailing address;

redirecting, by the mail redirect computer system, the first type of mail to the temporary mailing address according to the request and the first date and the second date;

instructing, by the mail redirect computer system, a delivery service provider to provide, based on the user profile, a package to the customer after the customer arrives at the temporary mailing address, wherein the package includes coupons for services or goods, selected based on the user profile, and a confirmation that the first type of mail will be redirected to the temporary mailing address;

instructing, by the mail redirect computer system, the delivery service provider to hold the second type of mail for a time period calculated based on the request;

receiving, by the mail redirect computer system from a remote computer system at the temporary mailing address, a notification that the customer has arrived at the temporary mailing address; and informing, by the mail redirect computer system, at least one contact specified by the customer that the customer has arrived at the temporary mailing address.

2. The method according to claim 1, wherein the first type of mail to redirect consists of at least one of: all mail, bills, or periodicals.

3. The method according to claim 1 wherein the request specifies that the first type of mail is to be redirected using an expedited mailing process.

4. The method according to claim 1, further comprising:

creating, by the mail redirect computer system, an electric trust account funded by the customer to cover a cost to redirect the first type of mail, wherein the estimated cost is based on how, how often, and where the first type of mail is redirected; and electronically debiting, by the mail redirect computer system, the electric trust account an amount to cover a cost of the redirecting.

5. The method according to claim 1, further comprising:

informing at least one mail source of the request to redirect the first type of mail from the mail source to the temporary mailing address.

6. The method according to claim 1, further comprising:

receiving an email address of the contact from the customer through the request.

7. The method according to claim 6, wherein the temporary mailing address is a hotel and the notification is received when the customer checks in at the hotel.

8. The method according to claim 6, wherein informing at least one contact of the customer's arrival comprises:

emailing the at least one contact based on at least one email address that is received.

9. The method according to claim 6, further comprising:
informing the at least one contact of the customer's contact information.

10. The method according to claim 1, further comprising:
providing information on the contents of a post office box to the customer, wherein the first type of mail is redirected to the post office box.

11. The method according to claim 10, wherein information on the contents of the post office box comprises a number of mail pieces in the post office box.

12. The method according to claim 1, wherein the package is provided based on profile information that is received from the customer.

13. The method according to claim 12, wherein the package includes at least one map of a location that is related to the customers interests and near the temporary mailing address, and is based on the profile information.

14. The method according to claim 1, further comprising:
canceling the redirecting a predetermined amount of time before the customer departs from the temporary mailing address; and
holding the first type of mail until the customer arrives at the current mailing address.

15. The method according to claim 14, wherein the first type of mail and the second type of mail are delivered on demand when the customer arrives at the current mailing address.

16. A non-transitory computer-readable storage medium storing instructions for controlling a mail redirect computer system to perform a method, the method comprising:
receiving a request to temporarily redirect a customer's mail, wherein the request specifies a user profile, a first type of mail to redirect, a second type of mail, the temporary mailing address, an arrival date the customer will arrive at the temporary mailing address, and a departure date the customer will depart from the temporary mailing address; and
determining a first date to begin mail redirection based on the arrival date and a number of days in advance required to redirect the first type of mail to the temporary mailing address, and determining a second date to cancel mail redirection based on the departure date and the number of days in advance required to redirect the first type of mail to the temporary mailing address;
redirecting the first type of mail to the temporary mailing address according to the request and the first date and the second date;
instructing a delivery service provider to provide, based on the user profile, a package to the customer after the customer arrives at the temporary mailing address, wherein the package includes coupons for services or goods, selected based on the user profile, and a confirmation that the first type of mail will be redirected to the temporary mailing address;
instructing the delivery service provider to hold the second type of mail for a time period calculated based on the request;
receiving, from a remote computer system at the temporary mailing address, a notification that the customer has arrived at the temporary mailing address; and
informing at least one contact specified by the customer that the customer has arrived at the temporary mailing address.

17. The non-transitory computer-readable storage medium according to claim 16, the method further comprising:
creating, by the mail redirect computer system, an electric trust account funded by the customer to cover a cost to redirect the first type of mail, wherein the estimated cost is based on how, how often, and where the first type of mail is redirected; and
electronically debiting, by the mail redirect computer system, the electric trust account an amount to cover a cost of the redirecting.

18. The non-transitory computer-readable storage medium according to claim 16, the method further comprising:
informing at least one mail source of the request to redirect the first type of mail from the mail source to the temporary mailing address.

19. The non-transitory computer-readable storage medium according to claim 16, the method further comprising:
providing information on the contents of a post office box to the customer, wherein the first type of mail is redirected to the post office box.

20. A mail redirect system for temporarily redirecting a customer's mail from a current mailing address to a temporary mailing address, the system comprising:
a processor disposed within the mail redirect system; and
a memory storing instructions that, when executed by the processor, cause the processor to:
receive a request to temporarily redirect the customer's mail, wherein the request specifies a user profile, a first type of mail to redirect, a second type of mail, the temporary mailing address, how to redirect the first type of mail, an arrival date, and a departure date, the arrival date being the date the customer will arrive at the temporary mailing address and the departure date being the date the customer will depart from the temporary mailing address;
determine a first date to begin redirection of the first type of mail based on the arrival date and a number of days in advance required to redirect the first type of mail to the temporary mailing address;
determine a second date to cancel redirection of the first type of mail based on the departure date and the number of days in advance required to redirect the first type of mail to the temporary mailing address;
redirect the first type of mail to the temporary mailing address according to the request and the first date and the second date;
instruct a delivery service provider to provide, based on the user profile, a package to the customer after the customer arrives at the temporary mailing address, wherein the package includes coupons for services or goods, selected based on the user profile, and a confirmation that the first type of mail will be redirected to the temporary mailing address;
instruct the delivery service provider to hold the second type of mail for a time period calculated based on the request;
receive, from a remote computer system at the temporary mailing address, a notification that the customer has arrived at the temporary mailing address; and
inform at least one contact specified by the customer that the customer has arrived at the temporary mailing address.

* * * * *

UNITED STATES PATENT AND TRADEMARK OFFICE
CERTIFICATE OF CORRECTION

PATENT NO.        : 8,818,914 B2
APPLICATION NO.   : 13/584218
DATED             : August 26, 2014
INVENTOR(S)       : Emily Andrew Page 1 of 1

It is certified that error appears in the above-identified patent and that said Letters Patent is hereby corrected as shown below:

In the Claims

In claim 3, column 6, line 42, "claim 1 wherein" should read --claim 1, wherein--.

In claim 13, column 7, line 16, "customers interests" should read --customer's interests--.

Signed and Sealed this
Twenty-third Day of December, 2014

Michelle K. Lee
*Deputy Director of the United States Patent and Trademark Office*